United States Patent

[11] 3,579,796

[72] Inventor Walter A. Fillion
 705 2nd St. N.E., Minneapolis, Minn. 55413
[21] Appl. No. 851,223
[22] Filed Aug. 19, 1969
[45] Patented May 25, 1971

[54] PULLER DEVICE FOR GENERALLY CYLINDRICAL STEM ASSEMBLIES OR VALVES
 5 Claims, 3 Drawing Figs.
[52] U.S. Cl. .................................. 29/263,
 29/259, 29/262
[51] Int. Cl. .................................. B23p 19/04
[50] Field of Search .................................. 29/214, 246, 249, 256, 258, 259, 260, 262, 263, 265

[56] References Cited
UNITED STATES PATENTS
| | | | |
|---|---|---|---|
| 836,478 | 11/1906 | Woerner | 29/263 |
| 2,050,005 | 8/1936 | Meegeman | 29/263 |

FOREIGN PATENTS
| | | | |
|---|---|---|---|
| 815,256 | 4/1937 | France | 29/263 |
| 844,419 | 7/1939 | France | 29/263 |

Primary Examiner—Andrew R. Juhasz
Assistant Examiner—Leon Gilden
Attorney—Williamson, Palmatier and Bains ABSTRACT: A puller device for longitudinally extracting generally cylindrical valve assemblies and the like and which have a slightly protruding outer end provided with a circumferential indentation. The improved device combines the use of an elongated puller shaft having means at the inner end for grasping and interlocking with said circumferential indentation, together with an annular abutment member surrounding the inner portion of the stem and having an end for abutment against the mounting of said cylindrical assembly, and a second cooperating puller nut also surrounding said stem and disposed outwardly of the first annular member and having extended threaded interconnection therewith. The combination further requires a shiftable lock device carried by the annular puller member for selective engagement with two diminished collars or grooves provided intermediately of the elongated stem. The outer annular puller element is screw threaded inwardly against the abutment member then interlocked with one of the collars of said stem and, in operation, is screwed outwardly with powerful force to pull the stem outwardly through the first abutment member.

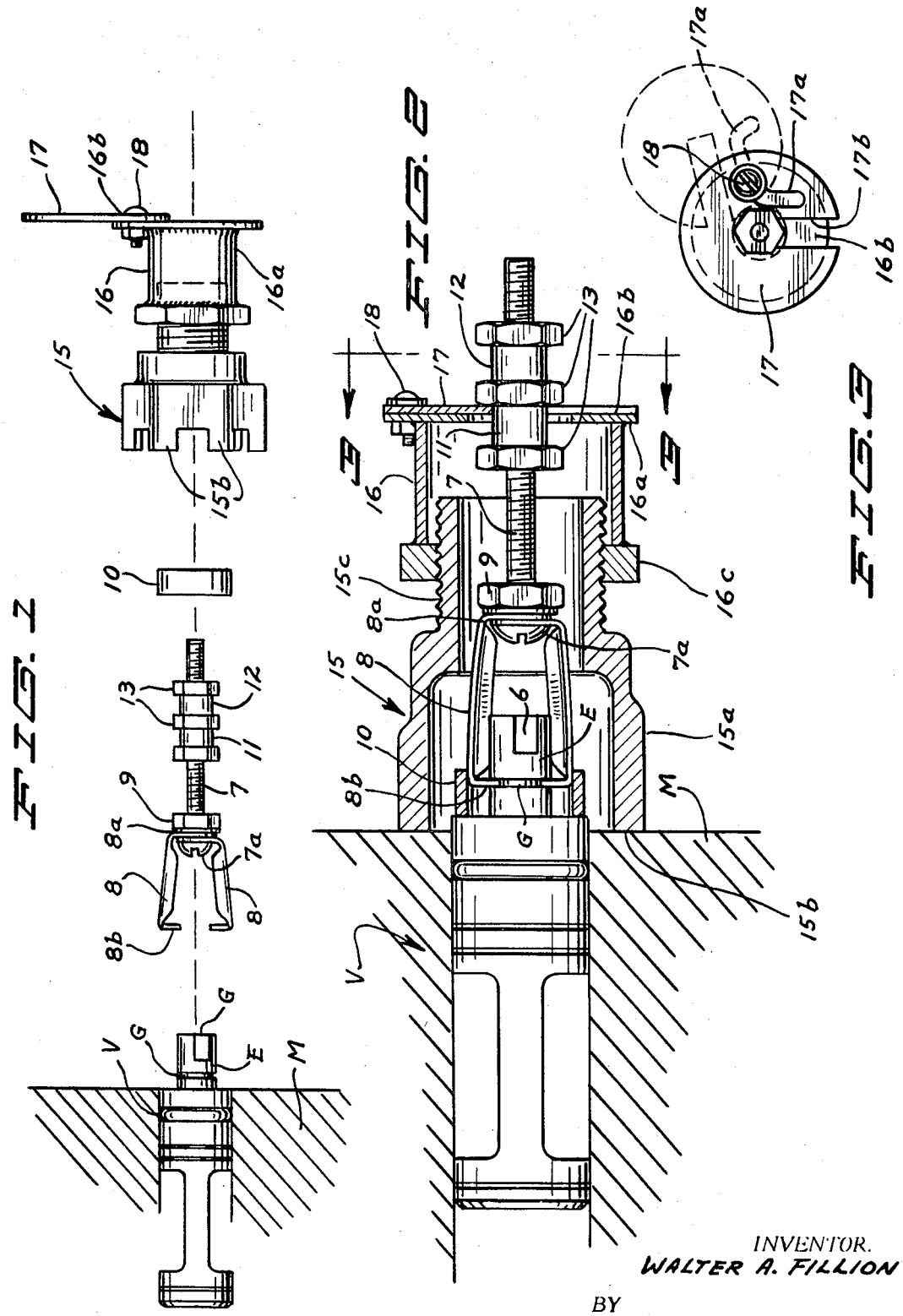

PULLER DEVICE FOR GENERALLY CYLINDRICAL STEM ASSEMBLIES OR VALVES

This invention relates to manually operated powerful puller devices for longitudinally extracting generally cylindrical stem assemblies or valves from the mountings or sockets containing the same. Such valves are quite generally employed in hot water radiators to regulate the flow of hot water to the coils of the radiator and include a stationary mounting and a generally cylindrical socket for receiving the stem assembly or valve. The assembly includes an axial projection at the outer end thereof provided with a terminal slot to facilitate turning by an instrumentality and usually having a circumferential groove or other indentation adjacent the extremity to receive a puller element.

It is an object of my invention to utilize a powerful screw or wedge action, preferably applicable in two or more stages, and employing, in addition to an elongated axial stem with means at its inner end for interlocking with the indentation, a pair of annular collars mounted on the stem and having extended screw-threaded relation whereby the inner collar acts as an abutment to engage the mounting surrounding the stem assembly to be pulled, and the second annular member constitutes a puller nut which, in retracted position relative to the first collar, may be interlocked with at least one indented collar on the stem and thereafter screwed outwardly by hand or by application of a wrench to forcibly pull the stem outwardly and thus retract the stem assembly or valve.

A further object of my invention is the provision of an extremely simple, compact device of the class described which may quickly, through manual operation, apply great outward force to pull the stem assembly or valve and which may be operated in at least two stages to obtain a substantial pulling force throughout a considerable length.

Further objects of the invention are the provision of rugged and durable cooperating elements which are essentially mounted upon one elongated axial stem and which cooperatively apply through application of torque to a screw force outward pulling of the stem with interlocking of the outer puller annulus with one or more collars indented and carried by the said stem.

The foregoing and other objects will be more apparent from the following description made in connection with the accompanying drawings wherein similar reference characters refer to similar parts throughout the several views, and in which:

FIG. 1 is an exploded side elevation showing a typical stem assembly or valve used in hot water radiators and showing the several components of my structure in spaced apart and exploded relation;

FIG. 2 is a similar side elevation with the several components of my device being interrelated for operation in pulling the stem assembly; and FIG. 3 is a rear elevation showing a shiftable lock plate connected with the rear face of the outer annular puller nut, the dotted lines showing released position of the plate.

Referring now in detail to the preferred structure of my device, a generally cylindrical stem assembly or valve, indicated as an entirety by the letter V, is shown mounted within a rigid chambered mounting M and having, as is conventional in such as assembly, a reduced axial end E which is provided at its extremity with a diametrical slot 6 for engagement with a screwdriver or other turning element and also provided, as is customary, with an indentation preferably in the form of an annular groove G, which is spaced a short distance inwardly from the extremity of the member E.

My puller device utilizes an elongate puller shaft 7 which is preferably threaded throughout the greater portion of its length and from its outward extremity for some distance inwardly, said stem 7 carrying at its inner end a suitable means for grasping and interlocking with the outer extremity of the assembly or valve. As shown, said means comprises a pair of cooperating swingable claws 8 integrally formed of a U-shaped spring metal piece having an intermediate anchoring portion 8a which is apertured for axially receiving the elongate shaft or screw 7. Screw 7 is provided with an integral head 7a at its inner end against which attachment portion 8a is abutted. A clamping nut 9 threaded upon shaft 7 secures the U-shaped spring which provides claws 8. Claws 8 are swingable inwardly into substantially parallel relation, and have terminal hook elements 8b interfitting the annular groove or indentation G near the extremity of the valve structure. After said claws are engaged with the groove G, a metal slide collar 10 is moved longitudinally over the claws to securely retain the same in interlocked relation with the groove G.

As shown, a pair of spaced locking collars 11 and 12 are provided in the outer portion of the elongated puller shaft 7 formed, as shown, by metal sleeves which loosely fit the puller shaft 7, said sleeves being predeterminately positioned by a plurality of nuts 13 which threadedly engage the outer portion of the threaded shaft 7. The purpose of said lock collars 11 and 12 will be more in detail explained later in this specification.

A relatively large annular abutment collar 15 having an internal diameter for very loosely surrounding the nut 13, and of course stem 7, is provided having, as shown, an enlarged forward section 15a with spaced feet 15b for concentric engagement and abutment against the mounting M directly surrounding the stem assembly or valve. The reduced outer portion 15c of the abutment collar is externally screw threaded throughout a substantial distance in length for threaded engagement with the internal threads of an annular puller nut element 16, the external threads of member 16 being shown in FIG. 2. The outer end of member 16 is flared and enlarged at 16a to provide a substantial planar rear surface 16b upon which is shiftably mounted a lock plate 17 (shown in detail in FIG. 3). Lock plate 17 is generally of disc-shape having a J-shaped slot 17a for accommodation of a headed pin 18 carried near one marginal edge of the planar surface 16b. The lock plate 17 has a relatively wide radial slot 17b of a width to surround and engage either of the collars 11 and 12 provided in spaced relation near the outer portion of the elongated puller shaft 7.

As shown in dotted lines in FIG. 3, lock plate 17 may be simultaneously swung and shifted in the slot 17a from the full line locking position with the collar to the retracted position in which the plate is disposed substantially outwardly of the planar surface 16b at the outer end of the annular puller nut 16.

The annular puller nut 16 preferably rigidly carries a polygonal-shaped wrench-engaging nut 16c to facilitate application of torque with great force through use of a tool, such as a wrench.

It will be understood that the annular abutment collar 15 and enlarged puller nut 16 are freely slidable over the nuts 13 which adjustably retain the lock collars in place on shaft 7, and also the abutment nut 15 is freely slidable at its enlarged portion 15a over the gripper claws 8 and the retaining collar 10 to completely assemble the device for operation in the position shown in FIG. 2 of the drawings. Nutted bolt 18 pivotally secures plate 17.

In operation, the elongated threaded shaft 7 is axially disposed of the protruding terminal E of the stem assembly or valve and the cooperating claws 8 are swung forwardly with the hook or claw ends 8b engaged with the annular groove or indentation G of the stem or valve. The slide collar 10 is then applied and slid to an intermediate position to positively retain the claws.

Thereafter the annular abutment collar 15 is slid inwardly upon the threaded shaft 7 to cause the abutment feet 15b thereof to engage in a circle concentrically surrounding the assembly to be pulled and bearing against the rigid mounting M.

The lock collars 11 and 12 may be previously or then adjusted by screw threading of the several cooperating retaining nuts 13 on the threaded shaft 7 to position the outermost collar 12 for engagement with the lock plate 17 when the annular puller nut 16 is screw-threaded inwardly in its most compact longitudinal relation with the abutment collar 15. The puller nut 16 is thereafter screw threaded into its retracted position and the shiftable lock plate 17 is positively engaged through its radius slot 17b with the outermost collar. It will be understood that the innermost collar 11 will be disposed predeterminately some distance inwardly from the outermost collar for a second stage pulling of the assembly or valve stem.

Thereafter, torque is applied to the annular puller nut 16, usually requiring only turning force of the fingers of the operator, but if a greater torque is needed a wrench may be applied to the integral nut portion 16c of the puller nut. Nut 16 is turned in counterclockwise direction, as illustrated in the drawings, to longitudinally move itself outwardly from the abutment nut 15 thereby, through lock action of the plate 17, exerting a very powerful longitudinal outward thrust on the stem assembly or valve.

If a second stage of pulling is needed to completely extract the stem assembly of valve from its seat, the lock plate 17 may be shifted outwardly to disconnect with the outermost collar 12. Puller nut 15 may then be threadedly retracted upon the externally threaded portion 15c of the abutment nut until lock plate 17 is in position to engage the innermost or secondary collar 11. Upon locking engagement with collar 11, the procedure is repeated with the puller nut 16 being counterclockwise turned to completely extract the assembly or valve from its seat.

It will be understood that while only two stages of pulling are provided for in the embodiment illustrated through the spaced collars 11 and 12, a succession of several collars may be employed for greater longitudinal displacement if this is required.

From the foregoing description, it will be seen that I have provided a very simple but highly efficient and powerful puller device for longitudinally retracting generally cylindrical elements, such as stem assemblies, valves and the like, which are normally deeply seated in a generally cylindrical socket of a mounting member such as a radiator.

The parts of my device may be very compactly collapsed upon the elongate threaded pull shaft 7 and may be compactly housed in a very small container, which may include one or more wrenches if desired.

I claim:

1. A puller device for longitudinally extracting generally cylindrical valve assemblies and the like of the type having an extremity projecting from a rigid mounting, said extremity being provided with a circumferential indentation,
   said puller device having an elongated puller shaft adapted to be positioned axially of said assembly,
   means at the inner end of said shaft for grasping and interlocking with said projecting end of said assembly,
   an annular abutment member surrounding the inner portion of said shaft and said grasping means and having an inner end for abutment against the mounting adjacent said projecting portion,
   an annular puller nut also surrounding said shaft and disposed outwardly of said annular abutment and having extended threaded interconnection with said abutment member, said shaft having at its outward portion an annular lock-receiving shoulder, and
   said puller nut having a shiftable lock plate slotted for locking and interengaging with said shoulder.

2. The structure set forth in claim 1 wherein said puller shaft carries a plurality of individually adjustable annular lock-receiving shoulders spaced inwardly at predetermined distances from the outer extremity of said shaft, and
   said lock plate being successively engageable with first the outermost and then the next innermost of said shoulders for multistage pulling action.

3. The structure set forth in claim 1 wherein said means for grasping and interlocking with the projecting end of said assembly constitutes a pair of opposed gripping claws having hooked ends for oppositely engaging the circumferential indentation of said assembly extremity, and
   a slidable slip collar for surrounding said claws in retracted position to retain the same in interlocking engagement with the projecting end of said assembly.

4. The structure set forth in claim 1 wherein said annular abutment member is concentrically applied over the inner end portion of said puller shaft and said gripping means and has an externally threaded outer end threadedly engageable with an internally threaded inner end of said puller nut.

5. The structure set forth in claim 1 wherein at least the outer portion of said puller shaft is externally threaded for predetermined adjustment of internally threaded nuts to position and limit at least a pair of said annular lock-receiving shoulders.